United States Patent
Poeppelmann

(10) Patent No.: US 11,283,608 B2
(45) Date of Patent: Mar. 22, 2022

(54) EXECUTING A CRYPTOGRAPHIC OPERATION

(71) Applicant: Infineon Technologies AG, Neubiberg (DE)

(72) Inventor: Thomas Poeppelmann, Munich (DE)

(73) Assignee: Infineon Technologies AG, Neubiberg (DE)

( * ) Notice: Subject to any disclaimer, the term of this patent is extended or adjusted under 35 U.S.C. 154(b) by 51 days.

(21) Appl. No.: 16/834,432

(22) Filed: Mar. 30, 2020

(65) Prior Publication Data

US 2020/0313886 A1    Oct. 1, 2020

(30) Foreign Application Priority Data

Mar. 28, 2019 (DE) .......................... 102019108095.9

(51) Int. Cl.
| | |
|---|---|
| *H04L 29/06* | (2006.01) |
| *G06F 21/00* | (2013.01) |
| *H04L 9/30* | (2006.01) |
| *H04L 9/32* | (2006.01) |
| *H04L 9/08* | (2006.01) |

(52) U.S. Cl.
CPC .......... *H04L 9/3093* (2013.01); *H04L 9/0869* (2013.01); *H04L 9/3236* (2013.01)

(58) Field of Classification Search
CPC ... H04L 9/3093; H04L 9/3236; H04L 9/0869; H04L 9/3239; H04L 9/002
See application file for complete search history.

(56) References Cited

U.S. PATENT DOCUMENTS

| | | | | |
|---|---|---|---|---|
| 5,870,473 | A * | 2/1999 | Boesch | H04L 63/0435 705/78 |
| 7,221,758 | B2 * | 5/2007 | Cramer | H04L 9/3013 380/277 |
| 9,130,801 | B1 * | 9/2015 | Carruth | H04L 29/06 |
| 2006/0077908 | A1 * | 4/2006 | Park | H04L 69/16 370/254 |
| 2008/0168273 | A1 * | 7/2008 | Chung | H04L 63/168 713/172 |
| 2014/0189359 | A1 * | 7/2014 | Marien | H04L 9/3234 713/172 |
| 2016/0125416 | A1 * | 5/2016 | Spencer | G06F 21/73 705/71 |

(Continued)

FOREIGN PATENT DOCUMENTS

WO    2018/206344 A1    11/2018

OTHER PUBLICATIONS

German Patent Office, Office Action issued for DE 102019108095.9, 8 pgs., dated Dec. 2, 2019.

(Continued)

*Primary Examiner* — Lisa C Lewis
(74) *Attorney, Agent, or Firm* — Schiff Hardin LLP

(57) ABSTRACT

A device and method for processing a ciphertext, including determining a seed using a secret key and the ciphertext, extracting a public key candidate from the ciphertext using the seed, determining a checkvalue candidate based on the public key candidate, comparing the checkvalue candidate with a checkvalue, and further processing the ciphertext if the comparison indicates that the checkvalue candidate corresponds to the checkvalue.

17 Claims, 6 Drawing Sheets

(56) References Cited

U.S. PATENT DOCUMENTS

| | | | | |
|---|---|---|---|---|
| 2016/0167653 | A1* | 6/2016 | Malone | H04L 12/403 |
| | | | | 701/23 |
| 2019/0075103 | A1* | 3/2019 | Li | H04L 9/3239 |
| 2020/0007342 | A1* | 1/2020 | Liem | H04L 9/0637 |

OTHER PUBLICATIONS

V. Lyubashevsky, et al., On Ideal Lattices and Learning Errors Over Rings, 203 pgs., dated: Jun. 25, 2013.

E. Alkim, et al., NewHope, Submission to the NIST post-quantum project, https://csrc.nist.gov/Projects/Post-Quantum-Cryptography/Round-1-Submissions.

E. Alkim, et al., NewHope Without Reconciliation, IACR Cryptology ePrint Archive: 1157 (2016).

E. Alkim, et al., Post-quantum key exchange—a new hope, IACR Cryptology ePrint Archive 2015: 1092 (2015).

T. Oder, et al., Practical CCA2-Secure and Masked Ring—LWE Implementation, IACR Eprint, Jan. 23, 2018 (accessed Jun. 15, 2018), https://eprint.iacr.org/2016/1109.pdf.

V. Lyubashevsky, et al., On Ideal Lattices and Learning with Errors Over Rings, Slides presented at Eurocrypt 2010, https://web.eecs.umich.edu/~cpeikert/pubs/ideal-lwe.pdf.

\* cited by examiner

EXECUTING A CRYPTOGRAPHIC OPERATION

TECHNICAL FIELD

Embodiments of the present disclosure relate to an approach to efficiently conducing a cryptographic operation, in particular to efficiently conduct a malleability check during a cryptographic operation.

SUMMARY

The objective is to improve existing solutions and in particular provide an efficient solution to conduct a malleability check.

The examples suggested herein may in particular be based on at least one of the following solutions. Combinations of the following features may be utilized to reach a desired result. The features of the method could be combined with any feature(s) of the device, apparatus or system or vice versa.

A method is suggested for processing a ciphertext,
wherein a secret key and the ciphertext are used to determine a seed,
wherein a public key candidate is extracted from the ciphertext utilizing the seed,
wherein a checkvalue candidate is determined based on the public key candidate,
wherein the checkvalue candidate is compared with a checkvalue,
wherein the ciphertext is further processed in case the comparison indicates that the checkvalue candidate corresponds to the checkvalue.

It is noted that the ciphertext or a portion of the ciphertext may be further processed in case the comparison indicates that the checkvalue candidate corresponds to the checkvalue.

The ciphertext may comprise several portions; at least one of such portion can be used to determine the payload (data or information) that needs to be processed further in case it can be confirmed that the ciphertext has not been tampered with.

It is an option to use at least one Hash function on at least one occasion to create a bit string that has a different appearance from the data that is input to the Hash function.

The checkvalue candidate may in particular correspond to the checkvalue in case both are identical or one can be unambiguously transformed into the other.

The ciphertext may be obtained by a receiver, which is in particular a cryptographic unit.

Hence, the solution allows for a malleability check during a cryptographic operation where the public key is extracted from the ciphertext and compared to the checkvalue as a reference value.

According to an embodiment, the secret key and the checkvalue are stored with a decoder or are accessible to the decoder.

The decoder may be a cryptographic unit running said method (also referred to as receiver).

According to an embodiment, a failure is determined in case the comparison indicates that the checkvalue candidate does not correspond to the checkvalue.

The failure may lead to a termination of the method or a notification indicating the failure may be issued.

According to an embodiment, the checkvalue is determined based on a Hash function of the public key.

Hence, the public key may be input to the Hash function to determine the checkvalue. As an option, at least one additional value may be input together with the public key in order to determine the checkvalue.

According to an embodiment, the checkvalue is determined based on a Hash function of two concatenated polynomials a and p, wherein the polynomial a is part of the public key and the polynomial p is the public key $p = r_1 - a \cdot r_2$ with $r_1$ and $r_2$ being randomly generated polynomials.

According to an embodiment, public key candidate value components a' and p' are extracted from the ciphertext $c_1$, $c_2$ by computing $$a' = (c_1 - e_2) e_1^{-1}$$

and $$p' = (c_2 - \text{RLWEencode}(v') - e_3) e_1^{-1},$$

wherein $e_1$, $e_2$ and $e_3$ are noise polynomials, v' is a decrypted ciphertext and RLWEencode ( ) is an encoding function.

According to an embodiment, the noise polynomial $e_1$ is generated such that it is invertible.

According to an embodiment, the method further comprises:
receiving the ciphertext,
wherein the secret key and the ciphertext are used to determine the seed by utilizing a decryption operation;
wherein the checkvalue candidate is determined based on the public key candidate by feeding the public key candidate to a generation function.

According to an embodiment, a payload message is decrypted based on the seed.

According to an embodiment, a payload message is determined based on the decryption operation.

According to an embodiment, an integrity check of the payload message is conducted using the seed, another portion of the ciphertext and at least one hash function.

According to an embodiment, such processing utilizes the Number Theoretic Transform.

According to an embodiment, the method is used on a security device or for operating a security device, wherein such security device comprises at least one of the following:
an integrated circuit,
a hardware security module,
a trusted platform module,
a crypto unit,
a FPGA,
a processing unit,
a controller,
a smartcard.

According to an embodiment, processing the ciphertext utilizes at least one cryptographic Lattice operation.

Further, a security device is provided that is arranged to execute the steps:
receiving a ciphertext;
determining a seed based on a secret key and the ciphertext;
extracting a public key candidate from the ciphertext utilizing the seed;
determining a checkvalue candidate based on the public key candidate;
comparing the checkvalue candidate with a checkvalue;
further processing of the ciphertext in case the comparison indicates that the checkvalue candidate corresponds to the checkvalue.

According to an embodiment, the security device is one of the following or comprises at least one of the following:

an integrated circuit,
a hardware security module,
a trusted platform module,
a crypto unit,
a FPGA,
a processing unit,
a controller,
a smartcard.

In addition, a computer program product is suggested, which is directly loadable into a memory of a digital processing device, comprising software code portions for performing the steps of the method as described herein.

Yet, a security device is suggested, which comprises:
means for receiving a ciphertext;
means for determining a seed based on a secret key and the ciphertext;
means for extracting a public key candidate from the ciphertext utilizing the seed;
means for determining a checkvalue candidate based on the public key candidate;
means for comparing the checkvalue candidate with a checkvalue;
means for further processing of the ciphertext in case the comparison indicates that the checkvalue candidate corresponds to the checkvalue.

BRIEF DESCRIPTION OF THE DRAWINGS

Embodiments are shown and illustrated with reference to the drawings. The drawings serve to illustrate the basic principle, so that only aspects necessary for understanding the basic principle are illustrated. The drawings are not to scale. In the drawings the same reference characters denote like features.

DETAILED DESCRIPTION

Figure 1:
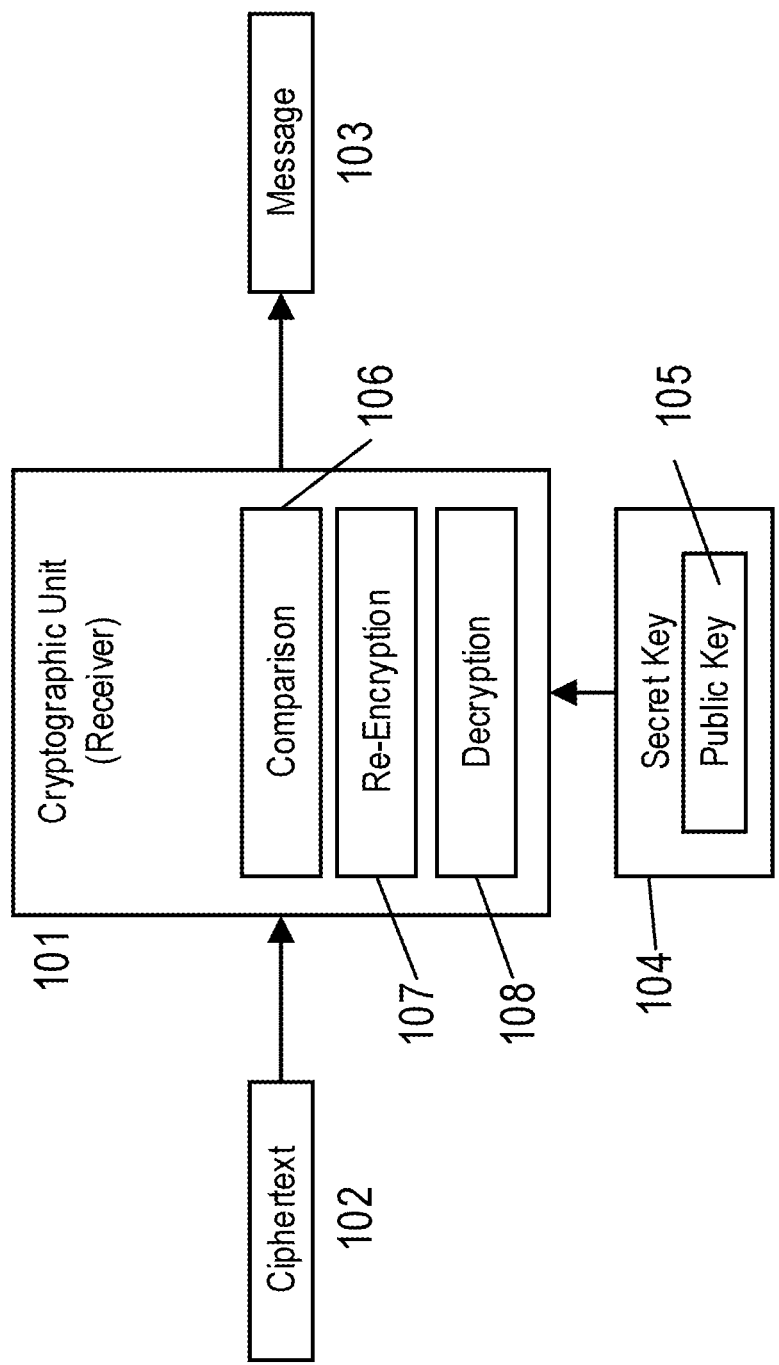
FIG. 1 shows a known approach to transform a CPA-secure PKE or a KEM into CCA-secure variants by utilizing a Fujisaki-Okamoto (FO) transform.

Various internet and industry standards use asymmetric cryptography based on RSA or elliptic curve cryptography (ECC) to protect data communication between smart cards, smart phones, computers, servers, or industrial control systems. As an example, with the RSA algorithm a public-key encryption (PKE) scheme can be realized that allows sending an encrypted email (e.g., with PGP/GPG or S/MIME) to a recipient without the need to first exchange a symmetric key via a secure channel. Instead, the public key of the recipient is sufficient to achieve confidentiality.

Other applications of asymmetric cryptography are digital signatures, also based on RSA or ECC. They can be used to sign and verify data and the public key is used to check the validity of a signature.

Together, PKE and digital signatures are both crucial in the Transport Layer Security (TLS) protocol which is the backbone of secured communication in the Internet and used by browsers, smart phones and IoT (Internet of Things) devices. TLS establishes a secured channel between two devices where communication is encrypted, checked for manipulation, and where the identity of the participants is verified using a digital certificate provided through a public-key infrastructure (PKI). When connecting to a website, e.g., of a bank, using https instead of http, the browser uses TLS. Commonly, a green lock and further information may be displayed to show that the communication is running with the bank's website and that attacks by a so-called man-in-the-middle are prevented. Without such PKI-based identity check in combination with strong data encryption it would be possible for attackers to manipulate the communication and to impersonate the accessed website.

However, it is known that RSA and ECC-based public keys might be subject to a successful attack using, e.g., quantum computers.

A quantum computer can be described as a computer that makes direct use of quantum-mechanical phenomena to accelerate processing. Crucial concepts to build a quantum computer are so-called quantum-bits or qubits that store a state in a quantum register. Such quantum computers may be used to successfully break cryptographic concepts that were considered sufficiently safe before such processing power was available.

Hence, there is a general motivation to move away from classical asymmetric cryptosystems (RSA/ECC) to schemes which cannot be successfully attacked by quantum computers. As a consequence, new solutions for signature schemes, key exchange, and public-key encryption are required that are not based on the same foundations as RSA and ECC (i.e., the discrete logarithm problem/factoring). This need for new technical solutions has already been acknowledged by standardization bodies like NIST (National Institute of Standards and Technology) investigating alternative cryptosystems.

A cryptosystem may be a cryptographic public key encryption, key exchange, or signature scheme or an advanced scheme like homomorphic encryption or attributed based encryption. In public-key encryption, a non-secret public key is used to encrypt data that can only be decrypted with the associated secret key. In signature schemes a secret key is used to sign a message and it can be verified with the associated public key that the signer was in possession of the secret key and thus authorized to produce the signature. Key exchange or key establishment is an interactive protocol where two parties establish a secret key that is unknown to a passive or sometimes active adversary or eavesdropper. Also, different options can be used combining public key encryption, key exchange, or signature schemes into protocols like, e.g., Transport Layer Security (TLS).

One class of schemes that is supposed to resist attacks by quantum computers are lattice-based cryptosystems. Lattice-based cryptosystems might become the successor of RSA and ECC and either operate on large matrices (standard lattices) or on polynomial rings (ideal lattices). For lattice-based cryptography, reference is made to, e.g., https://en.wikipedia.org/wiki/Lattice-based_cryptography.

A lattice is a structure that is created by integer linear combinations of basis vectors. Thus, a lattice can be described as a regular structure in an n dimensional space. Also, a lattice can be perceived as an arrangement of points in a Euclidean space with a regular structure. Given n linearly independent vectors $b_1, \ldots, b_n \in \mathbb{R}^m$, a lattice $\mathcal{L}$ generated by them is defined as $$\mathcal{L}_{(b_1,\ldots,b_n)} = \{\Sigma x_i b_i | x_i \in Z\},$$

wherein $b_1, \ldots, b_n$, is a basis of the lattice and an element from $\mathbb{R}^m$ is a vector with m entries from $\mathbb{R}$.

In the lattice $\mathcal{L}$ (i.e. an n-dimensional space) certain fundamental problems, like finding a short basis or a short vector are conjectured to be computationally hard or at least complex enough to use them for cryptography. Usually the hardness of breaking a lattice-based cryptosystem can be reduced or related to the hardness of solving such a fundamental problem. Lattice-based cryptography or a lattice-based cryptosystem is a cryptographic system whose security is based on the hardness or related to the hardness of certain mathematically hard problems in lattices.

Lattices may be used to construct cryptosystems. Lattice-based cryptography is also known with reference to the user-friendly learning with errors (LWE) problem and the ring-LWE (RLWE) problem. In this context a "problem" refers to a mathematical problem (e.g., finding something) that is conjectured to be hard to solve (i.e., no polynomial time algorithm is available) but that also allows the construction of a cryptographic scheme (e.g., like factoring problem for RSA or discrete logarithm for ECC).

In general, to solve an LWE problem, one has to recover a secret vector s over the ring of integer modulo q when given a set of approximate random linear equations on the secret vector s. Hence, the set of linear equations is distorted by a certain amount of randomness, which makes it hard for known algorithms to solve this set of equations.

The LWE and RLWE problems thus allow constructing schemes where the actual lattice structure is not really visible to the designer of a scheme. However, when proving the security of LWE/RLWE based schemes the lattice structure is used as well when trying to solve the LWE or RLWE problems as lattice algorithms are an efficient way to find the secret vector or polynomial s. This is also described as solving of a "lattice-problem". The RLWE problem works over polynomial rings and supports a security reduction to hard problems on ideal lattices while LWE enables reductions to arbitrary lattices. Ideal lattices carry more structure as not all lattices are ideal lattices but also allow the design of schemes that utilize more practical public-key, ciphertext, and signature lengths.

Prominent examples of lattice-based cryptography are the so-called NTRU and NTRU-sign schemes as well as the so-called GGH (Goldreich-Goldwasser-Halevi, see, e.g., https://en.wikipedia.org/wiki/GGH_encryption_scheme) scheme. For most schemes the conversion from public key encryption to key exchange is trivial. Additionally, for PKE various security levels like semantic security with respect to adaptive chosen plaintext (CPA) or semantic security with respect to adaptive chosen ciphertext attacks (CCA) can be achieved using standard conversions.

This has exemplarily been shown for the NewHope scheme that can also be instantiated as a CPA-secure or CCA-secure PKE [NewHopeNist17]. The NewHope-Simple and other schemes are a straightforward adaptation of a scheme called LPR10 (see [NewHopeSimplePaperEprint16]). Examples of lattice-based signature schemes are Dilithium, BLISS, GLP12, and qTESLA (see, e.g., https://csrc.nist.gov/Projects/Post-Quantum-Cryptography/Round-1-Submissions).

Technical Challenges Concerning Lattice-Based Cryptography

When realizing lattice-based cryptography and lattice-based cryptosystems on a computer, a microcontroller, an integrated circuit, in a hardware-software co-design or as fixed circuit, multiple technical challenges arise when performing cryptography operations (e.g., signing, encryption, decryption, verification, key generation). Examples for such technical challenges arising in the field are:

Achieve improved performance by performing steps of a cryptosystem using specifically optimized sequence of operations and by using all features of the available target hardware (special registers or instructions).

Performing a cryptographic operation using a minimal amount of volatile or non-volatile memory.

Realizing a cryptographic operation, or parts thereof, with a minimum amount of logic circuitry and memory cells (e.g., formed by a CMOS process) given a performance target.

Efficient and comprehensive protection against implementation attacks (also referred to as physical attacks, observatory attacks, invasive and semi-invasive attacks).

It is noted that protection against implementation attacks and/or physical attacks is in particular advantageous for cryptosystems that are executed on a security controller or in any adverse environment (e.g., a Hardware Security Module, HSM).

Possible attacks are side-channel attacks where an attacker tries to obtain secret information by observing the physical behavior of a device, like power consumption (e.g., simple or differential power analysis (SPA/DPA)), electric emanation, or temperature. Moreover, fault-attacks are a feasible where an attacker tries to introduce disturbances (e.g., with a laser) in the execution flow or data to obtain secret information or to influence the behavior of the device.

It is a feature of an implementation attack that such attack does not exploit a weakness in the mathematical description of a scheme (which would be considered cryptanalysis), but in the way the scheme is realized on a specific device. In general, the adversary is considered to have access to the device when performing an implementation attack.

Usually, a device like a smart card is constructed in a way that physical effects (e.g., power consumption or radiation) are disguised to make it hard to obtain security critical assets. A common approach to counter physical attacks is an execution on randomized values to prevent invasive and non-invasive attacks that pursue the objective of extracting a secret key or an intermediate value from the device. However, it is a technical challenge to realize such randomizations or redundancy in an efficient way and without opening up further attack opportunities.

Notation and Abbreviations

In particular, the following notations, abbreviations and references are used:

q is an integer, k is an integer, n is an integer, mod q is the modulo operation modulo q defined over the integers where the result is in the range $[0, q-1]$, Z are the integers (number written without a fractional component); for a definition of "number", reference is made to https://en.wikipedia.org/wiki/Number; for a definition of "fractional component", reference is made to https://en.wikipedia.org/wiki/Fraction_(mathematics), $\mathbb{R}$ are the real numbers (a value of a continuous quantity which may represent a distance along a line), $Z_q$ is the ring of integers modulo q which is the quotient ring Z/qZ of equivalence classes of integers modulo q X is an indeterminate, $f$ is a polynomial of maximum degree of inter n, R=Z[X]/($f$) is a ring of integer polynomials modulo $f$; the elements v∈Z[X]/($f$) can be represented by integer polynomials of a degree less than the integer n or alternatively as a vector of coefficients v∈$Z^n$, $R_q$=$Z_q$[X]/($f$) is a ring of integer polynomials modulo both the polynomial $f$ and the integer q; the elements v∈$Z_q$[X]/($f$) can be represented by integer polynomials of degree less than n with coefficients reduced modulo q or alternatively as a coefficient vector v∈$Z_g^n$, v∈$R_q$ is a polynomial (written in bold) that is an element in $R_q$, v[i] is a coefficient of a vector or polynomial v∈$R_q$ at a position i, $\vartheta$ is an error distribution, $\leftarrow^\$$ random sampling from a set or distribution, $D_{Z,\sigma}$ discrete Gaussian distribution over the integers with standard deviation σ, $\psi_k$ binomial distribution with integer parameter k, U( ) uniform distribution, $1001_b$ a number in binary notation, such that $1001_b$=9, U($R_{q,k}$) uniformly random sampling of a polynomial in $R_q$ where all coefficients are uniformly random in [k, k], FFT Fast Fourier Transform, NTT Number Theoretic Transform, DPA Differential Power Analysis, SPA Simple Power Analysis, ALU Arithmetic Logic Unit, PKE Public Key Encryption, KEM Key Encapsulation Mechanism, CCA Chosen Ciphertext Attack, CPA Chosen Plaintext Attack, IND Indistinguishability.

The quotient ring is a construction in abstract algebra; for details, reference is made to, e.g., https://en.wikipedia.org/wiki/Quotient ring.

Ideal Lattices and Polynomial Arithmetic

Currently, there exist two flavors of lattice-based cryptography, i.e. ideal lattice-based cryptography and standard lattice-based cryptography. A middle ground is a so-called modular lattice-based cryptography that mixes concepts from ideal and standard lattices. Reference is made to, e.g., [NewHopeNist17].

The basic operations in ideal lattice-based cryptography are polynomial multiplications, additions, or subtractions in the quotient ring $$R_q=Z_q[x]/(f),$$

where the modulus a is an integer and the dimension (number of coefficients) is an integer n. A polynomial a∈$R_q$ can be represented as an array of values and a single value a [i] at an integer position i can be accessed. All major computations in lattice-based cryptosystems schemes may be performed on arrays of values modulo q.

For the quotient ring, operations like addition and multiplication can be defined. An addition c=a+b for a, b, c∈$R_q$ may be defined as $$c = \sum_{i=0}^{n-1}(a[i]+b[i] \bmod q)\cdot X^i$$

where i is an integer, q is an integer, a [i] is the i-th coefficient of a, b[i] is the i-th coefficient of b and X is the indeterminate. A subtraction c=a−b works in the same manner with "+" being replaced by "−".

The product c=a b of polynomials a, b, c∈$R_q$ can also be computed. It is defined as a normal polynomial multiplication (sometimes also called "schoolbook" multiplication) followed by a reduction modulo the polynomial $f$ and a reduction modulo the integer q, i.e.

$$c = \left(\sum_{i=0}^{n-1}\sum_{j=0}^{n-1} a[i]b[j]x^{i+j} \bmod q\right) \bmod f.$$

The formula for polynomial multiplication can be simplified by considering the special rule that $x^n$=$^{-1}$ when $f$=$x^n$+1 but similar polynomials may be used accordingly:

$$c = \sum_{i=0}^{n-1}\sum_{j=0}^{n-1}(-1)^{\lfloor\frac{i+j}{n}\rfloor}a[i]b[j]x^{i+j \bmod n} \bmod q$$

where i and j are integers, q is an integer, a[i] is the i-th coefficient of a, b [j] is the j-th coefficient of b and x is the indeterminate.

Sparse Multiplication

Some efficiency for polynomial arithmetic can be gained with algorithms that exploit specific properties of polynomials. As an example, a polynomial s∈$R_q$ may only have few coefficients that are non-zero, it may also only consist of coefficients that are either one or minus one, or it may in general have coefficients that are small. Also, it may exhibit a combination of such properties.

The Number Theoretic Transform (NTT)

An implementation following this formula would require $n^2$ modular multiplications and would thus be rather expensive.

Another approach for fast polynomial multiplication is the number theoretic transform (NTT). The NTT is basically a fast Fourier transformation (FFT) defined over a finite field or ring. Thus, all complex roots of unity of the FFT are exchanged for integer roots of unity and computations are carried out in the ring of integers modulo an integer q. A polynomial multiplication for a, b, c∈$R_q$ using NTT can be computed as $$c=a\cdot b=NTT^{-1}(NTT(a)\circ NTT(b))$$

where "∘" denotes a coefficient-wise multiplication, â=NTT (a) is the transformation of the polynomial a, b̂=NTT (b) is the transformation of the polynomial b, and $NTT^{-1}$( ) is the inverse transformation. The coefficient-wise multiplication ĉ=â∘b̂ for, â, b̂, ĉ∈$Z_q$ [x] can be defined as $$\hat{c} = \sum_{i=0}^{n-1} (\hat{a}[i] \cdot \hat{b}[i] \bmod q) \cdot X^i.$$

The advantage of the NTT is that a polynomial multiplication operation only requires roughly $n \log_2 n$ modular multiplications when an efficient algorithm is used and that a reduction modulo $$f = x^n + 1$$

(the so-called circular convolution property) or a reduction modulo $$f = x^n - 1$$

can be integrated into the NTT algorithm. Thus an n-point NTT is sufficient to work with n-coefficient polynomials.

To formally introduce the NTT, the choice of parameters may be restricted; also, the following may be set such that the NTT exists:

$$f = x^n + 1$$

and $$q \equiv 1 \bmod 2n.$$

Further, a polynomial may be defined as follows $$g = \sum_{i=0}^{n-1} g[i] X^i \in R_q$$

such that $$NTT(g) = \hat{g} = \sum_{i=0}^{n-1} \hat{g}[i] X^i$$

with $$\hat{g}[i] = \sum_{j=0}^{n-1} \gamma^j g[i] \omega^{ij} \bmod q,$$

where the integer $\omega$ is an $2n$-th primitive root of unity modulo $q$ and integer $\gamma = \sqrt{\omega} \bmod q$. So $\gamma$ is a square root of $\omega$ modulo $q$.

The inverse transformation works similar. For a polynomial $\hat{g} \in R_q$ it can be defined as:

$$NTT^{-1}(\hat{g}) = g = \sum_{i=0}^{n-1} g[i] X^i$$

with $$g[i] = \left( n^{-1} \gamma^{-i} \sum_{j=0}^{n-1} \hat{g}[j] \omega^{-ij} \right) \bmod q.$$

A straightforward computation of the NTT with the previously given definition has quadratic complexity and is not more efficient than the schoolbook approach. Thus, to realize fast polynomial multiplication using the convolution theorem, a fast algorithm to compute the NTT is required. This can be achieved via an implementation of the NTT with $O(n \log n)$ operations in $Z_q$, e.g., by the Cooley-Tukey radix-2 decimation-in-time (DIT) algorithm (see, e.g., https://en.wikipedia.org/wiki/Cooley%E2%80%93Tukey_FFT_algorithm) or by a decimation-in-frequency (DIF) algorithm. The DIT NTT algorithm recursively splits the computation into a sub-problem on the even inputs and a sub-problem on the odd inputs of the NTT.

Computation of a Polynomial Inverse

The computation of the Polynomial Inverse may be required in signatures and can be used for implementation of security measures.

Some of the cryptographic algorithms require the computation of the inverse of a polynomial $a^{-1}$ for $a \in R_q$ such that $a \cdot a^{-1} = 1$.

There is an approach known as Fermat's little theorem to compute the multiplicative inverse of integers in $Z_q$ but it can also be applied to $R_q$. The polynomial multiplicative inverse $a^{-1}$ can be computed as $a^{-1} = a^{q-2}$ when a is invertible. This process can be sped up using the NTT and known methods for exponentiation like (right-to-left or left-to-right) square-and-multiply, or an addition chain.

When a is transformed into the NTT domain, a multiplication is just a coefficient-wise multiplication.

As an example, $a^3$ can be computed based on $a' = NTT(a)$ as follows:

$$a^3 = NTT^{-1}(a' \circ a' \circ a'),$$

which is usually faster than computing $a^3 = a * a * a$ using algorithms like schoolbook or Karatsuba multiplication.

With an addition chain the number of coefficient-wise multiplications can be further reduced depending on the share of q.

Randomness and Random Sampling $a \xleftarrow{\$} S$ indicates an action of selecting the variable a independently and uniformly at random from some set S or a specific distribution S.

It is noted that "random" or "uniform" in this regard (e.g., selecting randomly or any random value) may be a true random, a pseudo-random or a deterministic approach to obtain a value. Hence, the property of such "randomness" or any random effect according to the proposal provided herewith may be that an attacker is unaware of the value and that values are different for at least a portion of operations. The randomness in particular adds a certain level of entropy between values that are "randomly" determined, e.g., generated and/or selected.

For a finite set S, a uniform distribution on the set S may be referred to as U(S). The notation $a \xleftarrow{\$} U(R_{q,k})$ may indicate a uniformly random sampling of $a \in R_q$ where all coefficients of a are $[-k, k]$.

For a probability distribution $\chi$ on R it is assumed that an efficient sampling is feasible and the notation $a \xleftarrow{\$} \chi$ is used to denote the random sampling of $a \in R$ from the probability distribution $\chi$.

The sampling of secret noise or error vectors is a basic task in lattice-based public-key encryption (PKE), key exchange, or signature schemes. A particular attribute of such noise or error vectors is that they are usually small (i.e., with coefficients that are close to zero).

A discrete Gaussian distribution $D_{Z,\sigma}$ with mean 0 and standard deviation $\sigma > 0$ over the integers associates a probability $\rho_\sigma(x)/\rho_\sigma(Z)$ to $x \in Z$ for $$\rho_\sigma(x) = \exp\left(\frac{-x^2}{2\sigma^2}\right)$$

and $\rho_\sigma(Z) = 1 + \Sigma_{i=1}^{\infty} \rho_\sigma(i)$.

Thus $a \xleftarrow{\$} D_{Z,\sigma}$ denotes a process of randomly sampling a value $d \in Z$ according to the discrete Gaussian distribution $D_{Z,o}$ and $a \leftarrow^\$ D_{Z,o}^n$ indicates a process of randomly sampling of a polynomial $a \in R_q$ of dimension n where coefficients are independent and distributed according to the discrete Gaussian distribution $D_{Z,o}$.

A sampler that produces values according to a discrete Gaussian distribution can be realized using the cumulative distribution function (CDF) or a cumulative distribution table (CDT) or with (e.g., high-precision) computations.

The execution of a cryptographic scheme usually requires 512 to 4096 samples from the noise or error distribution for each cryptographic operation.

An exemplary distribution that can be used for sampling purposes is the binomial distribution $\Omega_k$. A sample from this binomial distribution $\Omega_k$ may be generated by computing $$\sum_{i=0}^{k-1} b_i - b_i',$$

wherein $b_i$, $b_i' \in \{0,1\}$ are random bits.

Thus, $a \leftarrow^\$ \psi_k$ denotes a process of randomly sampling a value $d \in Z$ according to the binomial distribution $\psi_k$.

Further, $a \leftarrow^\$ \psi_k^n$ denotes a process of randomly sampling a polynomial $a \in R_q$ of a dimension n, wherein coefficients are independent and distributed according to the binomial distribution $\psi_k$.

The standard deviation of the binomial distribution is $\sqrt{k/2}$ and the variance amounts to k/2. An alternative approach to sample from the binomial distribution $\psi_k$ is to compute $$\left( \sum_{i=0}^{2k-1} b_i \right) - k$$

with $b_i \in \{0,1\}$ being random bits.

Mathematical Problems on Lattices

The security of lattice-based cryptosystems may be based on or can be related to certain problems. Such specific problems are:
- the Learning with errors problems (LWE);
- the Ring Learning with errors problem (RLWE);
- the short integer solution problem (SIS);
- the Ring short integer solution problem (RSIS); and
- the NTRU problem.

For RLWE the following applies in the ring $R_q = Z_q[X]/(X^n+1)$ for n being an integer power of 2 and q being an integer:

The secret vector $s \in R_q$ is based on a distribution $\vartheta_1$, the error vector e is based on a distribution $\vartheta_2$, wherein the distribution $\vartheta_1$ may be the same as the distribution $\vartheta_2$.

The vector $a \in R_q$ with uniform coefficients in $Z_q$ is based on a uniform distribution (hence, it is also denoted as "uniform vector").

An attacker wants to extract the secret vector s when given the uniform vector a as well as the result $b = a \cdot s + e$.

This is difficult if the secret vector s and/or the error vector e follow a predefined distribution design, hence, if the vectors s and/or e will be created in an efficient way. Also, the generation of these vectors s and/or e may be hardened against physical attacks on a chipcard.

A chipcard (or smartcard) may be any physical device arranged to conduct a cryptographic function. The chipcard may therefore in particular comprise one semiconductor circuit.

It is an option that the secret vector s is fixed, generating uniform vectors a and generating error vectors e according to the particular distribution design. Still, the attacker has difficulties to derive the fixed secret vector s from multiple samples of vectors a and b.

The RLWE problem translates the LWE problem into the ring setting. The hardness of RLWE is based on the worst-case hardness of short-vector problems on ideal lattices, which are a subclass of standard lattices. The RLWE problem also has a decision problem (decide if a sample a, b is from the RLWE distribution or uniform) that is equivalent to the search version.

Hence, if the attacker is able to determine that the sample b is uniform or generated according to the RLWE distribution, the security of the system may be compromised.

It is possible to sample the secret $s \in R_q$ from the uniform distribution $U(R_q)$. However, beneficially, the sampling may be based on the distribution $\vartheta$.

Operations in standard lattice-based cryptography comprise matrix-matrix multiplications, matrix-vector multiplications, or vector additions and subtractions where coefficients are values in the ring of integers modulo q.

Method for Malleability Check in Lattice-Based Cryptography

Technical security properties of Public Key Encryption (PKE) and Key Encapsulation Mechanisms (KEM) are indistinguishability under chosen-plaintext attack (IND-CPA) or indistinguishability under adaptive chosen ciphertext attack (IND-CCA2). The IND-CPA security notion is a basic security notion.

However, it means that the IND-CPA attack model does not consider the attacker's interaction with a decryption oracle. In other words, this IND-CPA attack model only works in case an attacker has no access to the decryption oracle, which unfortunately is not always the case. For example, in scenarios utilizing chip cards where the private key is stored on the chip card, the chip card can be considered as a decryption oracle and such chip card may be accessible to the attacker. However, it should be ensured that a secret key which is stored on the chip card and used for processing purposes is not accessible to the attacker.

FIG. 1 shows a known approach to transform a CPA-secure PKE or a KEM into CCA-secure variants by utilizing a Fujisaki-Okamoto (FO) transform (see [OSPG18]).

FIG. 1 comprises a cryptographic unit 101 (also referred to as receiver) for decryption purposes. The cryptographic unit 101 comprises a comparison function 106, a re-encryption function 107 and a decryption function 108. The cryptographic unit 101 also has access to a secret key 104 comprising a public key 105. A ciphertext 102 is fed to the cryptographic unit 101 and (in case of a successful decryption) transformed in a message 103.

The idea of the FO transform is to make the basic CPA-secure public-key encryption scheme deterministic, wherein all operations require randomness. Such randomness is derived from a seed. During CCA-secure public-key encryption the random seed is also encrypted as message or can be derived from the message of the CPA-secure public key encryption scheme and sent to the receiver.

The receiver, i.e. said cryptographic unit 101, can then use the private key (i.e. the secret key 104) to decrypt the seed. To prevent manipulation of the ciphertext 102 (i.e. a chosen ciphertext attack) the receiver 101 uses the seed to perform a re-encryption via the re-encryption function 107. The output of the re-encryption is compared by the comparison function 106 with the received ciphertext 102. This ensures that only untampered ciphertexts 102 are accepted.

The control of the attacker over the seed and other values is limited by using hash functions (modeled as random oracles) and an output of such hash functions is also used to mask the actual payload (usually a short message or a key of 128 to 256-bit length).

However, the disadvantage of the FO transformation is that it requires computing the re-encryption. This means the secret key 104 needs to contain the public key 105 or any other information that suffices to re-compute the public key. This requires additional computations and increases the size of the secret key 104. Additionally, the re-encryption 106 is a costly operation and hard to protect against side-channel attacks (see [OSPG18]).

Examples described herein provide a different way of ensuring ciphertext integrity, especially in RLWE, MLWE, or LWE-based lattice-based PKEs or KEMs. During key generation, a secret key of the CCA-secure PKE is generated in a way that it comprises the secret key of the CPA-secure PKE and a checkvalue that can be considered as a hash of public key components.

Figure 2:
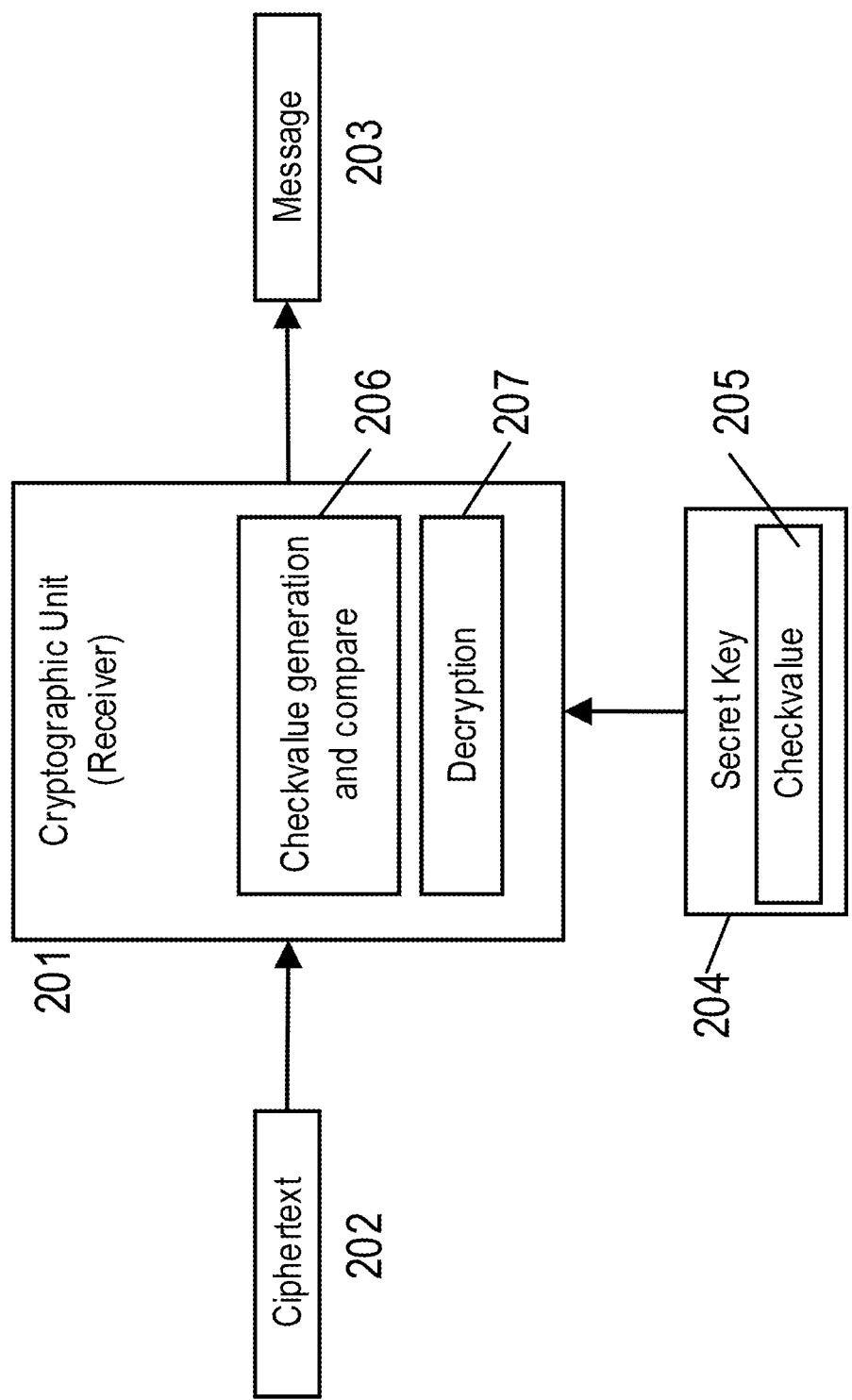
FIG. 2 shows an exemplary block diagram to visualize this approach using a private key (secret key) and a checkvalue for decryption purposes in a cryptographic unit (also referred to as receiver)

FIG. 2 shows an exemplary block diagram to visualize this approach using a private key (secret key 204) and a checkvalue 205 for decryption purposes in a cryptographic unit 201 (also referred to as receiver). The cryptographic unit 201 comprises a function 206 that supports generating the checkvalue and conducting a comparison. Also, the cryptographic unit 201 comprises a decryption function 207. The various functions 206, 207 may be realized as single functions or as a combined function; they may be implemented on one or more hardware entities.

A ciphertext 202 is fed to the cryptographic unit 201 and (in case of a successful decryption) transformed in a message 203 for further processing.

During CCA-secure decryption, this checkvalue 205 can be used to ensure that the ciphertext 202 has not been tampered with by checking that the correct public key components are present in the ciphertext 202 (i.e., by comparing the hash of the extracted public key components with the checkvalue generated by a function $f(\ )$).

The advantage of this approach is that the secret key of the CCA-secure PKE does not have to contain a large public key and that no public key generation based on a small seed is required, which by itself costs performance and increases the risk of physical attacks (e.g., side-channel attacks) being successful.

Exemplary CPA and CCA-Secure Lattice-Based Public-Key Encryption (PKE) and Key Exchange Scheme (KEM)

The properties of the RLWE problem can be used to realize a semantically secure public-key encryption scheme with a reduction to decisional RLWE. Thus, in the plain version only security against chosen plaintext attacks (CPA) is achieved and is categorized as a lattice-based cryptosystem as the hardness is based on the hardness of the RLWE problem which itself is based on the hardness of certain lattice problems.

An exemplary idea of the scheme is to hide the secret key inside of an RLWE sample that becomes the public key $p \in R_q$ $$p = r_1 - a \cdot r_2,$$

wherein a is a randomly generated public polynomial and $r_1, r_2 \in R_q$ are noise polynomials.

Further, the message is masked with an RLWE sample $$p \cdot e_1 + e_3,$$

with $e_1, e_3 \in R_q$ being noise polynomials.

Thus, the public key and each ciphertext appear random to a passive adversary and semantic security is achieved.

Reference is also made to LPR10 as described in [LPR10A] and [LPR10B].

For example, the following procedures may be utilized:

Key Generation:
RLWE.CPA.Gen:
1. seedA $\leftarrow^\$ \{0,1\}^{256}$
2. Choose a $\leftarrow$ GenA(seedA)
3. $r_1 \leftarrow^\$ \vartheta$
4. $r_2 \leftarrow^\$ \vartheta$
5. Public key (pk): (seedA, $p = r_1 - a \cdot r_2$)
6. Secret key: (sk): $r_2$
7. Return pk=(seedA, p), sk=$r_2$ The key generation procedure RLWE.CPA.Gen comprises the deterministic generation of the uniformly random polynomial a $\leftarrow$ GenA(seedA) with a$\in R_q$ from a random binary seed seedA for which a generator function GenA is used.

This generator function GenA performs a step a $\leftarrow^\$ U(R_q)$ in a deterministic manner, e.g., by using an extendable output function (XOF) like SHA3 and rejection sampling. The seed seedA is a uniformly random bit string of 256-bit and its sampling is denoted as seedA $\leftarrow^\$ \{0,1\}^{256}$. In general, the polynomial a may be chosen during key generation based on a seed (as part of each public key) or it may be regarded as a global constant. In the example shown herein, the public key pk comprises the seedA and the polynomial $p \in R_q$.

Reference is made to [NewHopeNist17] for further details on a specific description of the GenA function.

This is an improvement to reduce the size of the public key pk and to increase the security level. Due to seedA it is not required to make the polynomial a part of the public key, which leads to a smaller public key. By sampling seedA it is also ensured that for each freshly generated public key a newly generated polynomial a is used. This may prevent attacks that would exploit using the same value for the polynomial a in multiple public keys.

Additionally, a random sampling of two noise polynomials $r_1, r_2 \in R_q$ from the noise/error distribution $\vartheta$ is conducted.

The noise polynomial $r_1$ may be used during key generation only and it may be discarded afterwards, whereas the noise polynomial $r_2$ may correspond to the secret key.

An extraction of the secret key $r_2$ from the public key pk is considered equivalent to solving the RLWE problem.

Encryption:
RLWE.CPA.Enc(pk=(seedA, p), m$\in\{0,1\}^n$, seedRand)
1. $e_1 \leftarrow^\$$ SampleNoise$_\vartheta$(seedRand, 1)
2. $e_2 \leftarrow^\$$ SampleNoise$_\vartheta$(seedRand, 2)
3. $e_3 \leftarrow^\$$ SampleNoise$_\vartheta$(seedRand, 3)
4. a $\leftarrow$ GenA(seedA)
5. $\overline{m}$=RLWEencode(m).
6. Return c=($c_1 = a \cdot e_1 + e_2$, $c_2 = p \cdot e_1 + e_3 + \overline{m}$)

The encryption procedure RLWE.CPA.Enc comprises sampling of three noise polynomials $e_1, e_2, e_3$ from the error distribution $\vartheta$.

This step is performed in a deterministic manner using the function SampleNoise$_\vartheta$(seedRand, i) that outputs a polynomial in $R_q$ distributed according to the error distribution $\vartheta$ based on the seed seedRand and the selection parameter i. With i={1, 2, 3}, different and computationally independent output values may be derived from one seed seedRand. It is a generalization of a SampleNoisePoly function described in [OSPG18] for various distributions. Reference is also made to [NewHopeNist17] where the PolyBitRev(Sample(noise-seed,0)) may be used to realize SampleNoise$_\theta$(seedRand, 1). Applicable error distributions may be the discrete Gaussian distribution $D_{Z,\sigma}$ or the Binomial distribution $\psi_k$.

To hide the message m (which may be a binary string) in the ciphertext, the message m is encoded as $\overline{m} \in R_q$ by the function RLWEencode, e.g., using additive threshold encoding (as referred to in [OSPG18] as "LWEencode") and added to $p \cdot e_1 + e_3 \in R_q$.

The ciphertext comprises $c_1 \in R_q$ and $c_2 \in R_q$ which may basically be both RLWE samples in Hermite normal form.

Security against chosen plaintext attacks (CPA) follows from the fact that everything that is returned by the encryption algorithm appears (from the outside) indistinguishable from random.

Decryption:

RLWE.CPA.Dec($c=(c_1, c_2)$, sk=$r_2$):
 1. Return RLWEdecode($c_1 r_2 + c_2$)

The decryption procedure RLWE.CPA.Dec requires knowledge of the secret key $r_2 \in R_q$ since otherwise the large term $r_2$ a $e_1 \in R_q$ cannot be eliminated when computing $c_1 r_2 + c_2$.

The function RLWEdecode is described in [OSPG18] as a function "LWEDecode". During decryption, the RLWEdecode function is required, because the n-bit message $\overline{m}$ comprises some minor amount of noise (i.e., $r_2 e_2 + r_1 e_1 + e_3$) after calculating $c_1 r_2 + c_2$, which would otherwise not allow the retrieval of the message m:

$$c_1 r_2 + c_2 = (ae_1 + e_2)r_2 + pe_1 + e_3 + m$$
$$== r_2 a e_1 + r_2 e_2 + r_1 e_1 - r_2 a e_1 + e_3 + m$$
$$== m + r_2 e_2 + r_1 e_1 + e_3.$$

The scheme is usually instantiated in the polynomial ring $R_q$, but usage of other rings is feasible as well. Possible choices for noise or error distributions $\vartheta$ are $D_{Z,\sigma}^n$ or $\psi_k^n$.

The noise may be relatively small as all noise terms may be sampled from the error distribution $\vartheta$. Hence, this remaining noise can be handled using approaches like (additive) threshold encoding for individual coefficients.

Exemplary parameters to instantiate the scheme are:
- (n=256, q=4093, $\vartheta = D_{Z,\sigma}^n$, $\sigma$=8.35) to which roughly 100 bit security is attributed;
- (n=512, q=12289, $\vartheta = D_{Z,\sigma}^n$, $\sigma$=11.31) to which roughly 128 bit security is attributed; and
- (n=1024, q=12289, $\vartheta = \psi_k^n$, k=16) to which roughly 256 bit security is attributed.

Utilization of the Checkvalue

According to an embodiment, a checkvalue $\beta$ can be generated during key generation so that a secret key sk is determined as $$sk = (r_2, \beta),$$

with $\beta$=Hash(a||p), wherein || indicates a concatenation between a$\in R_q$ and p$\in R_q$. Hash( ), H( ), H'( ) and G( ) denote hash functions that are independent from each other.

The generation (RLWE.CCA.Gen), encryption (RLWE.CCA.EncNew) and decryption (RLWE.CCA.DecNew) functions may be realized as follows:

RLWE.CCA.Gen:
 1. seedA$\leftarrow^\$ \{0,1\}^{256}$
 2. Choose a$\leftarrow$GenA(seedA)
 3. $r_1 \leftarrow^\$ \vartheta$
 4. $r_2 \leftarrow^\$ \vartheta$
 5. Public key (pk): (seedA, $p = r_1 - a \cdot r_2$)
 6. Secret key: (sk): $r_2$
 7. Return pk=(seedA, p), sk=($r_2$, $\beta$=Hash(a||p)).

RLWE.CCA.EncNew(seedA, p, $m_{CCA} \in \{0,1\}^L$):
 1. Choose a nonce v$\leftarrow^\$ \{0,1\}^L$
 2. Compute $c_1, c_2$=RLWE.CPA.EncNew((seedA, p), v, II (v||$m_{CCA}$)) using a hash function H. In case RLWE.CPA.EncNew returns FAIL, restart by jumping to step 1.
 3. Compute $c_3$=G(v) xor $m_{CCA}$ using a hash function G
 4. Compute $c_4$=H'(v) using a hash function H' (which is different from the hash function H)
 5. Return $c_1, c_2, c_3, c_4$ In the function RLWE.CCA.EncNew the seed that is encrypted using the CPA secure scheme RLWE.CPA.EncNew is a random bit string v and an internal pseudo random generator (PRNG) of the function RLWE.CPA.EncNew is initialized with seedRand=$H(v\|m_{CCA})$.

The actual message that is chosen by the user during encryption is $m_{CCA}$. It is protected by the value $c_3$ as it is Exclusive-Or combined ("xor-ed") with G (v). The RLWE.CPA.EncNew function called in the RLWE.CCA.EncNew function can be defined as follows:

RLWE.CPA.EncNew(pk=(seedA, p), m$\in \{0,1\}^n$, seedRand)
 1. $e_1 \leftarrow^\$$ SampleNoise$_\theta$(seedRand, 1)
 2. Check that $e_1$ is invertible and if $e_1$ is not invertible return FAIL.
 3. $e_2 \leftarrow^\$$ SampleNoise$_D$(seedRand, 2)
 4. $e_3 \leftarrow^\$$ SampleNoise$_p$(seedRand, 3)
 5. a$\leftarrow$GenA (seedA)
 6. $\overline{m}$=RLWEencode(m).
 7. Return c=($c_1 = a \cdot e_1 + e_2$, $c_2 = p \cdot e_1 + e_3 + \overline{m}$)

The value $e_1 \in R_q$ in the function RLWE.CPA.EncNew is sampled such that the inverse $e_1^{-1} \in R_q$ exists, i.e. that $e_1^{-1} e_1 = 1$. Otherwise, the function RLWE.CPA.EncNew returns FAIL (indicating a failure) and the function RLWE.CCA.EncNew is started with different choices for seedRand until $e_1$ fulfills the invertibility condition.

RLWE.CCA.DecNew($r_2$, $\beta$, $c_1, c_2, c_3, c_4$):
 1. Compute $v' = m'_{CPA}$=RLWE.CPA.Dec($c_1, c_2, r_2$)
 2. Compute $m'_{CCA}$=G (v')xor $c_3$ using the hash function G
 3. seedRand=$H(v'\|m'_{CCA}))$ using the hash function H
 4. $e_1 \leftarrow^\$$ SampleNoise$_\theta$(seedRand, 1)
 5. $e_2 \leftarrow^\$$ SampleNoise$_\theta$(seedRand, 2)
 6. $e_3 \leftarrow^\$$ SampleNoise$_\theta$(seedRand, 3)
 7. $a' = (c_1 - e_2)e_1^{-1}$
 8. $p' = (c_2 - \text{RLWEencode}(v') - e_3)e_1^{-1}$
 9. Compute $c_4'$=H'(v') using the hash function H'
 10. Check whether Hash(a'||p')==$\beta$
 11. Check whether $c_4' == c_4$
 12. If both conditions in No. 7 and No. 8 above are true, output $m'_{cca}$ else output failure For decryption purposes, the noise polynomials $e_1, e_2, e_3 \in R_q$ are generated as described with regard to the function RLWE.CPA.Enc based on seedRand=$H(v'\|(m'_{CCA}))$.

Then, a candidate value $a' \in R_q$ is computed as $$a' = (c_1 - e_2)e_1^{-1}$$

and a candidate value $p' \in R_q$ is computed as $$p' = (c_2 - \text{RLWEencode}(m) - e_3)e_1^{-1}.$$

Both candidate values a' and p' are concatenated, hashed and compared with the checkvalue $\beta$ so that the message $m'_{cca}$ is returned only if the following condition is fulfilled:

Hash(a'||p')==$\beta$.

Figure 3:
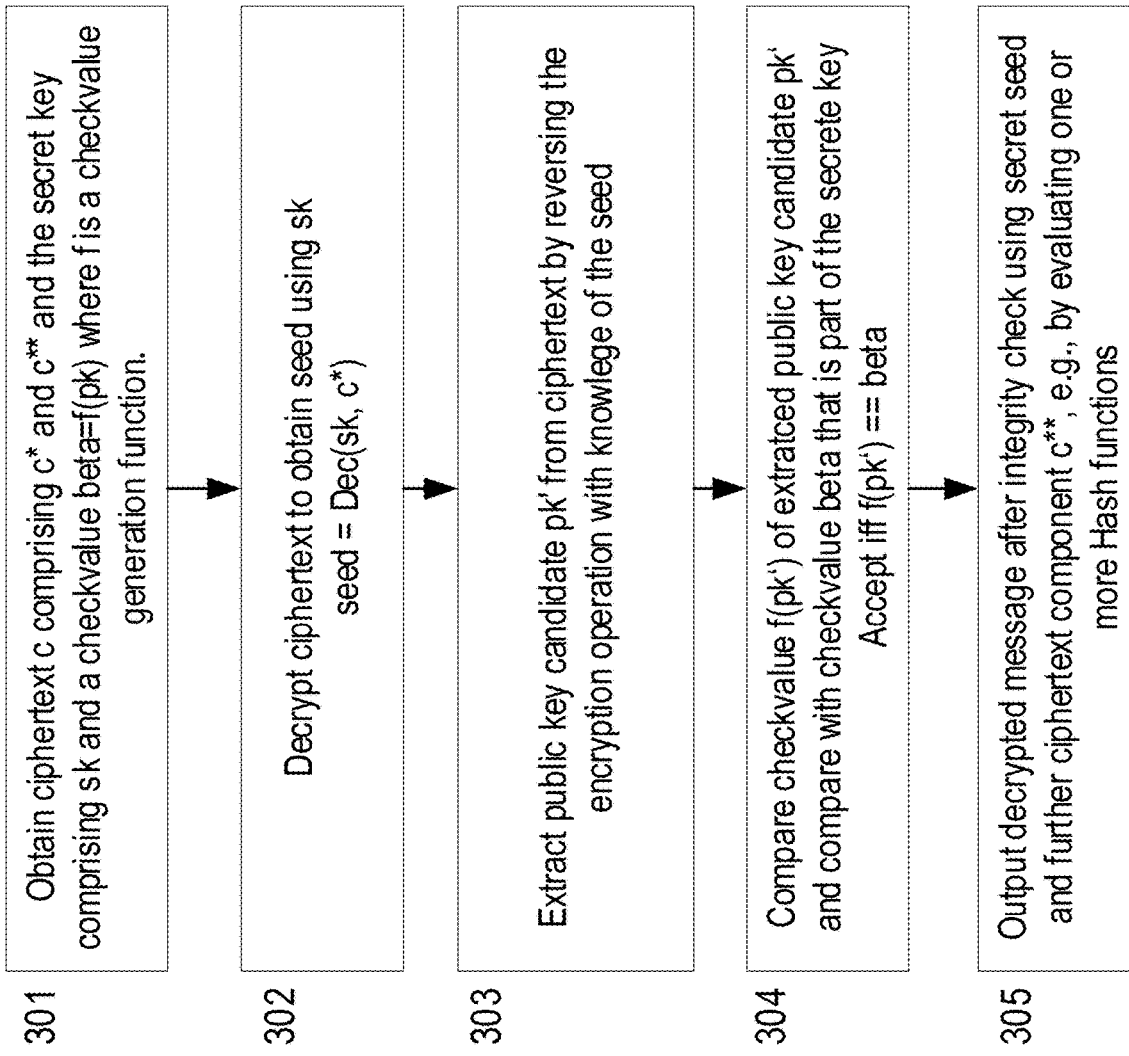
FIG. 3 shows a schematic flow chart comprising steps summarizing utilizing the checkvalue $\beta$ in an efficient way.

FIG. 3 shows a schematic flow chart comprising steps 301 to 305 summarizing the solution that involves the checkvalue $\beta$.

Step 301: A ciphertext c is obtained at a receiver, e.g., a cryptographic unit. The ciphertext c comprises c* and c**. Also, the receiver has access to the secret key sk and the checkvalue $\beta$. The receiver also has access to a generation function f( ) that allows determining the checkvalue $\beta$ from the public key pk.

Step 302: Using the secret key sk, the receiver decrypts the ciphertext c* to obtain a seed:

$$\text{seed}=\text{Dec}(sk,c^*).$$

This basically corresponds to the step 1 of the RLWE.C-CA.DecNew algorithm shown above.

Step 303: A public key candidate pk' is extracted from the ciphertext. This is achieved by applying an encryption operation, which comprises the reverse decryption as used in step 302.

This basically corresponds to the step 8 of the RLWE.C-CA.DecNew algorithm shown above.

Step 304: The public key candidate pk' is input to the generation function f( ) to determine a checkvalue candidate $$\beta'=f(pk').$$

The checkvalue candidate is compared with the checkvalue, i.e.

$$\beta'==\beta?$$

If this is true, the output message might be accepted as correct; if this is false, a failure notification may be issued.

This basically corresponds to the step 10 of the RLWE.C-CA.DecNew algorithm shown above.

Step 305: As an option, an integrity check of the message may be conducted using the seed and the ciphertext component c**. This can be done utilizing at least one hash function.

If the integrity check was successful, the message can be output or used for further processing.

If the integrity check was not successful, a failure notification may be issued, and the message is considered invalid.

This basically corresponds to the steps 2, 9 and 11 of the RLWE.CCA.DecNew algorithm shown above.

Figure 4:
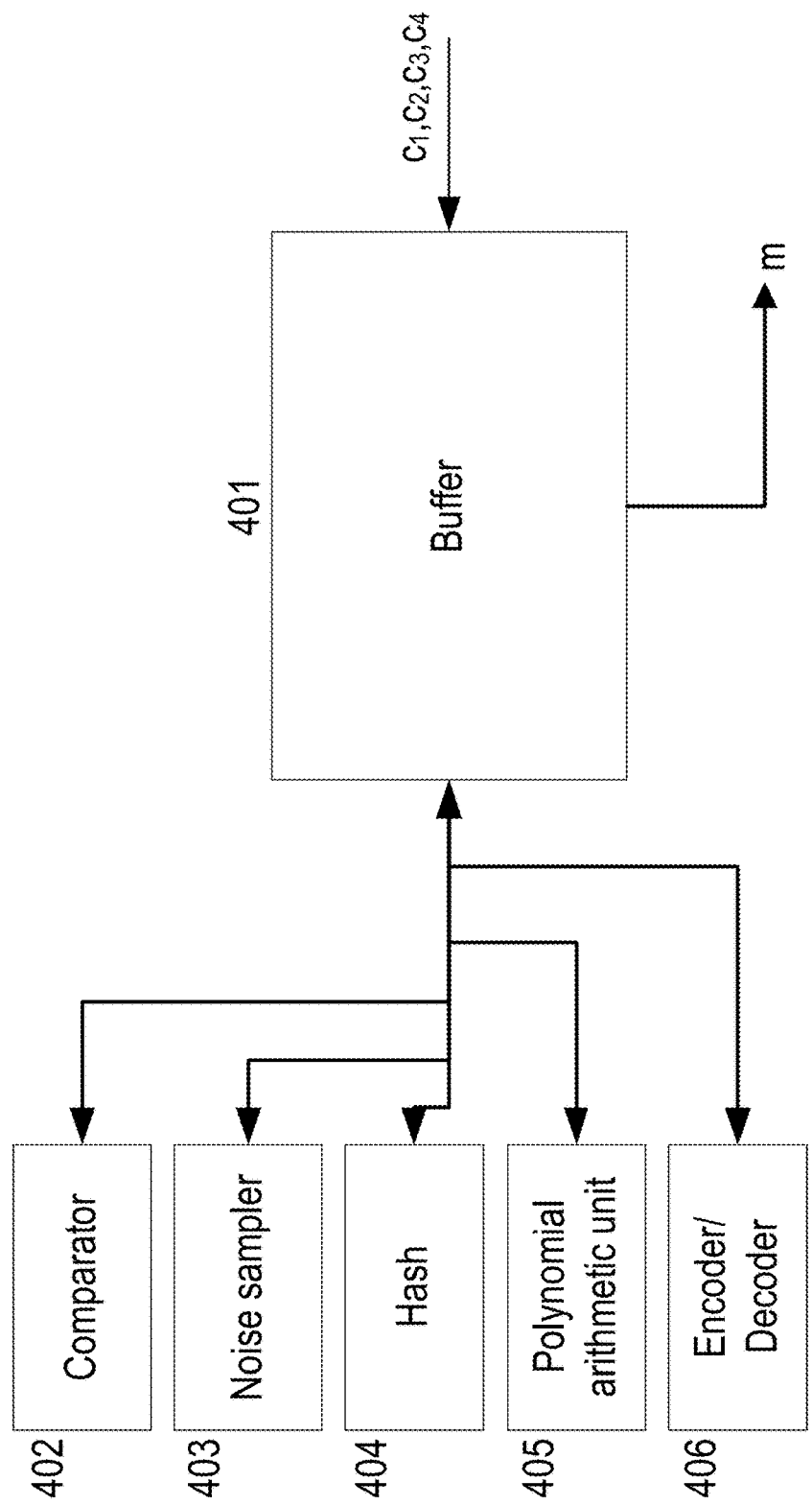
FIG. 4 shows an exemplary block diagram comprising a buffer that is coupled to a system bus and several functional (software and/or hardware) components.

FIG. 4 shows an exemplary block diagram comprising a buffer 401 that provides encapsulation/decapsulation functionality where binary strings are interpreted as mathematical objects in a portable manner. The buffer 401 is coupled to a system bus, which may provide the ciphertext ($c_1$, $c_2$, $c_3$, $c_4$) and which is used to convey the decrypted message m.

The buffer 401 is coupled to a comparator 402, a noise sampler 403, a Hash unit 404 (capable of providing hash values based on at least one hash function), a polynomial arithmetic unit 405 and an Encoder/Decoder 406. The units 402 to 406 may be realized in software and/or hardware. These units 402 to 406 may be implemented separately or they may at least be partially combined.

Advantages and Further Embodiments and Options

Advantageously, in the function RLWE. CCA. DecNew, the checkvalue $\beta$ is the output of a standard hash function and may thus range from 32 byte to 64 byte.

Usage of the NTT

The solution described herein may be optimized using the NTT. A "~" notation may denote elements in NTT representation and assume that $r_2 \in R_q$ and $c_1 \in R_q$ are stored or transmitted in NTT representation and that the checkvalue $\beta$ is computed during key generation as $$\beta=\beta_{NTT}=\text{Hash}(\tilde{a}\|\tilde{p})$$

for $\tilde{a}=\text{NTT}(a)$ and $\tilde{p}=\text{NTT}(p)$.

Using NTT is a known technique as disclosed in, e.g., [OSPG18]. It could be applied to the concept addressed herein as follows:

RLWE. CCA. DecNewNTT($\tilde{r}_2$, $\beta$, $\tilde{c}_1$, $c_2$, $c_3$, $c_4$):

1. Compute v'=m'$_{CPA}$=RLWEdecode(INTT($\tilde{c}_1 \circ \tilde{r}_2$)+$c_2$)
2. Compute m'$_{CCA}$=G(v') xor $c_3$ using the hash function G
3. seedRand=H(v'$\|$m'$_{CCA}$)) using the hash function H
4. $\tilde{e}_1 \leftarrow^\$$ NTT (SampleNoise$_\theta$(seedRand, 1))
5. $\tilde{e}_2 \leftarrow^\$$ NTT (SampleNoise$_D$(seedRand, 2))
6. $e_3 \leftarrow^\$$ SampleNoise$_\theta$(seedRand, 3)
7. $\tilde{a}'=(\tilde{c}_1-\tilde{e}_2)\tilde{e}_1^{-1}$
8. $\tilde{p}'=\text{NTT}(c_2-\text{RLWEencode}(v')-e_3)\tilde{e}_1^{-1}$
9. Compute $c_4$*=H'(v') using the hash function H'
10. Check whether Hash($\tilde{a}'\|\tilde{p}'$)==$\beta$
11. Check whether $c_4'==c_4$
12. If both conditions in No. 10 and No. 11 above are true, output m'$_{cca}$ else output failure Using NTT enables an efficient way of computing the inverse $\tilde{e}_1^{-1}$, which can be used during CCA-secure encryption to test the invertibility of $\tilde{e}_1$ in the RLWE. CCA. EncNewNTT function that can also use the NTT as described in [OSPG18].

Side-Channel Protection

In [OSPG18] various methods for side-channel protection of lattice-based cryptography are described.

Side-channel protection can also be incorporated into the approach described herein to provide an efficient solution for malleability protection.

The shared operation of the hash functions, encoder, decoder and noise sampler from [OSPG18] can be used. The critical operations $$\tilde{a}=(\tilde{c}_1-\tilde{e}_2)\tilde{e}_1^{-1}$$

and $$\tilde{p}'=\text{NTT}(c_2-\text{RLWEencode}(v')-e_3)\tilde{e}_1^{-1}$$

where internal values except $c_1$, $c_2$ are sensitive (e.g., security critical) can be randomized as follows:

1. $e_1^*,e_1^{**} \leftarrow^\$$ AdditiveSharedSampleNoise$_\theta$(seedRand, 1)
2. $e_2^*,e_2^{**} \leftarrow^\$$ AdditiveSharedSampleNoise$_\theta$(seedRand, 2)
3. $e_3^*,e_3^{**} \leftarrow^\$$ AdditiveSharedSampleNoise$_\theta$(seedRand, 3)
4. $a'^*=(c_1-e_2^*)e_1^{*-1}$
5. $a'^{}=(c_1-e_2^{})e_1^{**-1}-e_2^*e_1^{*-1}-e_2^{}e_1^{-1}$
6. $\overline{m}^*,\overline{m}^{**}$=AdditiveSharedRLWEencode(v''*,v''**)
7. $p'^*=(c_2-\overline{m}^*-e_3^*)e_1^{*-1}$
8. $p'^{}=(c_2-\overline{m}^{}-e_3^{})e_1^{-1}-(\overline{m}^*-e_3^*)e_1^{*-1}-(\overline{m}^{}-e_3^{})e_1^{**-1}$
9. SharedHash(a'*$\|$a'**,p'*$\|$p'**)==$\beta$ The function AdditiveSharedSampleNoise$_\theta$ outputs two values $e_1^*$, $e_1^{**}$, which are random additive/arithmetic shares of the value $e_1$ such that $e_1=e_1^*+e_1^{**}$. Reference is made to [OSPG18] in which such a masked sampler is described in Section 3.3.4.

The function AdditiveSharedRLWEencode takes two Boolean shared values v'*, v'** such that v=v'* xor v'** and outputs additive/arithmetic shares of the encoded message. The subtraction $$e_2^*e_1^{*-1}+e_2^{}e_1^{-1}$$

and the subtraction of $$(\overline{m^*}-e_3{}^*)e_1{}^{*-1}+(\overline{m^{}}-e_3{}^{})e_1{}^{**-1}$$

corrects an error that has been introduced by the masking so that the additively shared values can be processed by a hash function taking added shared values as input and then be securely compared with the checkvalue $\beta$.

Another option to protect the computation would be providing a multiplicative masking. For efficiency improvement purposes, the NTT may be applied.

Examples described herein may be applicable for variants of the Lyubashevsky, Peikert, Regev 2010 cryptosystem or other schemes like NewHope or Kyber. In addition, scenarios utilizing a combination with schemes like LWE-based Frodo is are also feasible.

Implementation Examples

Figure 5:
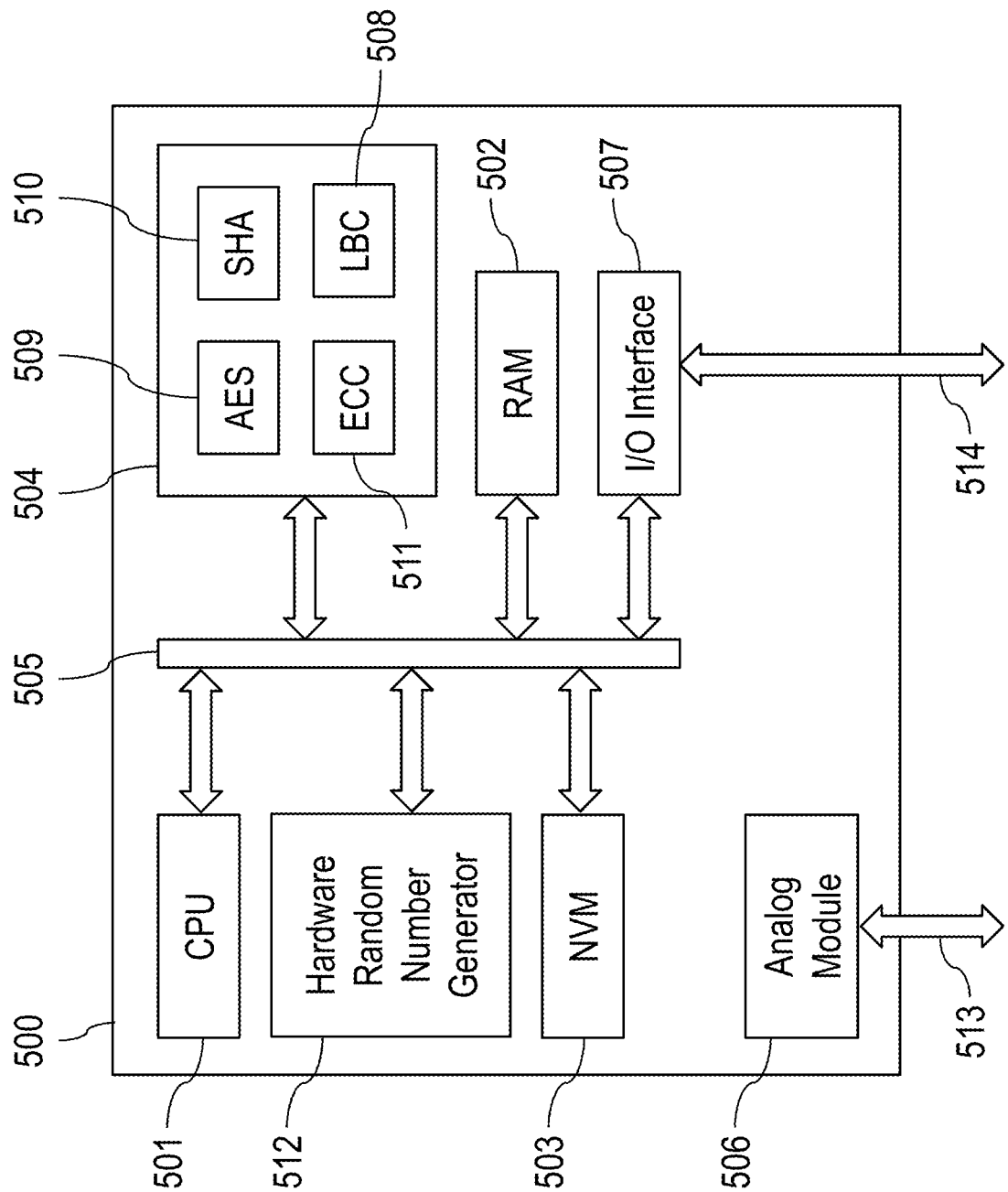
FIG. 5 shows an exemplary arrangement of a processing device comprising a CPU, a RAM, a non-volatile memory, a crypto module, an analog module, an input/output interface and a hardware-random number generator.

FIG. 5 shows a processing device 500 comprising a CPU 501, a RAM 502, a non-volatile memory 503 (NVM), a crypto module 504, an analog module 506, an input/output interface 507 and a hardware-random number generator 512.

In this example, the CPU 501 has access to at least one crypto module 504 over a shared bus 505 to which each crypto module 504 is coupled. Each crypto module 504 may in particular comprise one or more crypto cores to perform certain cryptographic operations. Exemplary crypto cores are:

an AES core 509,
a SHA core 510,
an ECC core 511, and
a lattice-based crypto (LBC) core 508.

The lattice-based crypto core 508 may be provided in order to accelerate lattice-based cryptography.

The CPU 501, the hardware random number generator 512, the NVM 503, the crypto module 504, the RAM 502 and the input/output interface 507 are connected to the bus 505. The input output interface 507 may have a connection 514 to other devices, which may be similar to the processing device 500.

The crypto module 504 may or may not be equipped with hardware-based security features.

The analog module 506 is supplied with electrical power 513 via an electrical contact and/or via an electromagnetic field. This power is supplied to drive the circuitry of the processing device 500 and may in particular allow the input/output interface to initiate and/or maintain connections to other devices via the connection 514.

The bus 505 itself may be masked or plain. Instructions to process the steps described herein may in particular be stored in the NVM 503 and processed by the CPU 501. The data processed may be stored in the NVM 503 or in the RAM 502. Supporting functions may be provided by the crypto modules 504 (e.g., expansion of pseudo random data). Random numbers are supplied by the hardware-random number generator 512.

Steps of the method described herein may exclusively or at least partially be conducted on the crypto module 504, e.g., on the lattice-based crypto core 508. For example, instructions may be stored in the lattice-based crypto core 508 or they may be provided by the CPU 501 via the bus 505. Data may be stored locally with the lattice-based crypto core 508. It is also an option that the data is temporarily stored in the RAM 502 or the NVM 503. The lattice-based crypto core 508 may also use other crypto modules to provide supporting functions (e.g., expansion of pseudo random data). The lattice-based crypto core 508 may also comprise a hardware-random number generator or a means to generate physical and/or software random numbers.

The processing device 500 may be a chip card powered by direct electrical contact or through an electro-magnetic field. The processing device 500 may be a fixed circuit or based on reconfigurable hardware (e.g., Field Programmable Gate Array, FPGA). The processing device 500 may be coupled to a personal computer, microcontroller, FPGA or a smart phone.

Figure 6:
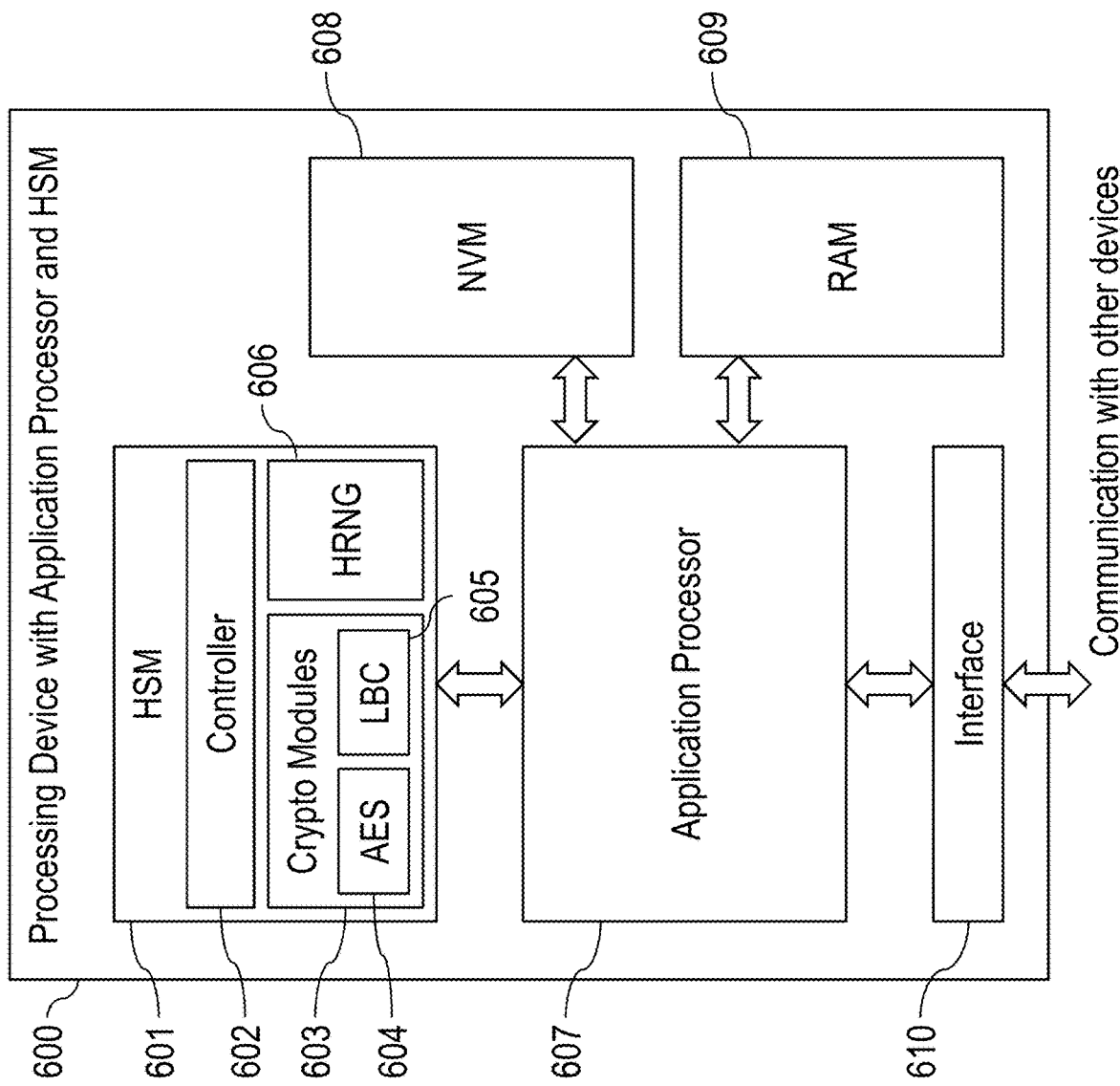
FIG. 6 shows an alternative arrangement with a hardware security module (HSM).

FIG. 6 shows another example of a processing device 600. The processing device 600 comprises a hardware security module 601, a non-volatile memory (NVM) 608, a random access memory (RAM) 609, an interface 610 for communication with other devices and an application processor 607, which is coupled with the hardware security module (HSM) 601, the RAM 609, the NVM 608 and the interface 610.

The HSM 601 comprises a controller 602, a hardware-random number generator (HRNG) 606 and at least one crypto module 603. The crypto module 603 exemplarily comprises an AES core 604 and a Lattice-based crypto (LBC) core 605.

According to one embodiment, the HSM 601 and the application processor 607 may be fabricated on the same physical chip with a tight coupling. The HSM 601 delivers cryptographic services and secured key storage while the application processor may perform computationally intensive tasks (e.g., image recognition, communication, motor control). The HSM 601 may be only accessible by a defined interface and considered independent of the rest of the system in a way that a security compromise of the application processor 607 has only limited impact on the security of the HSM 601. The HSM 601 may perform all tasks or a subset of tasks described with respect to the processing device 600 by using the controller 602, the LBC 605, supported by, exemplary, an AES 604 and the HRNG 606. It may execute the procedures described herein (at least partially) either controlled by an internal controller or as CMOS circuit. Moreover, also the application processor 607 may perform the procedures described herein (at least partially, e.g., in collaboration with the HSM 601).

The processing device 600 with this application processor 607 and HSM 601 may be used as a central communication gateway or (electric) motor control unit in cars or other vehicles.

In one or more examples, the functions described herein may be implemented at least partially in hardware, such as specific hardware components or a processor. More generally, the techniques may be implemented in hardware, processors, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium, i.e., a computer-readable transmission medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a single hardware unit or provided by a collection of interoperative hardware units, including one or more processors as described above, in conjunction with suitable software and/or firmware.

Although various exemplary embodiments of the disclosure have been disclosed, it will be apparent to those skilled in the art that various changes and modifications can be made which will achieve some of the advantages of the disclosure without departing from the spirit and scope of the disclosure. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the disclosure may be achieved in either all software implementations, using the appropriate processor instructions, or in hybrid implementations that utilize a combination of hardware logic and software logic to achieve the same results. Such modifications to the inventive concept are intended to be covered by the appended claims.

The invention claimed is:

1. A method for processing a ciphertext, comprising:
  determining, by a hardware configured to process the ciphertext in a manner that increases robustness of the ciphertext processing against physical attacks, a seed using a secret key and the ciphertext;
  extracting, by the hardware, a public key candidate from the ciphertext using the seed;
  determining, by the hardware, a checkvalue candidate based on the public key candidate;
  comparing, by the hardware, the checkvalue candidate with a checkvalue; and
  further processing, by the hardware, the ciphertext to output decrypted ciphertext if the comparison indicates that the checkvalue candidate corresponds to the checkvalue.

2. The method according to claim 1, further comprising:
  storing, by the hardware, the secret key and the checkvalue with a decoder, or making the secret key and the checkvalue accessible to the decoder.

3. The method according to claim 1, further comprising:
  determining, by the hardware, a failure if the comparison indicates that the checkvalue candidate does not correspond to the checkvalue.

4. The method according to claim 1, further comprising:
  determining, by the hardware, the checkvalue based on a Hash function of the public key.

5. The method according to claim 1, further comprising:
  determining, by the hardware, the checkvalue based on a Hash function of two concatenated polynomials a and p,
  wherein the polynomial a is part of the public key, and the polynomial p is the public key $p=r_1-a \cdot r_2$ with $r_1$ and $r_2$ being randomly generated polynomials.

6. The method according to claim 1, further comprising:
  extracting, by the hardware, public key candidate value components a' and p' from the ciphertext $c_1$, $c_2$ by computing $$a'=(c_1-e_2)e_1^{-1}, \text{ and}$$

$$p'=(c_2-\text{RLWEencode}(v')-e_3)e_1^{-1}, \text{ and}$$

wherein $e_1$, $e_2$ and $e_3$ are noise polynomials, v' is the decrypted ciphertext and RLWEencode( ) is an encoding function.

7. The method according to claim 6, further comprising:
  generating, by the hardware, the noise polynomial $e_1$ to be invertible.

8. The method according to claim 1, further comprising:
  receiving the ciphertext;
  determining, by the hardware using the secret key and the ciphertext, the seed by using a decryption operation; and
  determining, by the hardware, the checkvalue candidate based on the public key candidate by feeding the public key candidate to a generation function.

9. The method according to claim 8, further comprising:
  decrypting, by the hardware, a payload message based on the seed.

10. The method according to claim 8, further comprising:
  determining, by the hardware, a payload message based on the decryption operation.

11. The method according to claim 10, further comprising:
conducting, by the hardware, an integrity check of the payload message using the seed, another portion of the ciphertext, and at least one hash function.

12. The method according to claim 1, wherein the processing uses the Number Theoretic Transform.

13. The method according to claim 1, wherein the method is used on a security device or for operating a security device, wherein the security device comprises at least one of an integrated circuit, a hardware security module, a trusted platform module, a crypto unit, a FPGA, a processor, a controller, and a smartcard.

14. The method according to claim 1, wherein processing the ciphertext uses at least one cryptographic Lattice operation.

15. A security device comprising a memory and at least one of an integrated circuit, a hardware security module, a trusted platform module, a crypto unit, a FPGA, a processor, a controller, and a smartcard configured to:
receive, by a hardware configured to process a ciphertext in a manner that increases robustness of the ciphertext processing against physical attacks, the ciphertext;
determine, by the hardware, a seed based on a secret key and the ciphertext;
extract, by the hardware, a public key candidate from the ciphertext utilizing the seed;
determine, by the hardware, a checkvalue candidate based on the public key candidate;
compare, by the hardware, the checkvalue candidate with a checkvalue; and
further process the ciphertext to output decrypted ciphertext if the comparison indicates that the checkvalue candidate corresponds to the checkvalue.

16. The security device according to claim 15, wherein the security device is one of the following or comprises at least one of an integrated circuit, a hardware security module, a trusted platform module, a crypto unit, a FPGA, a processor, a controller, and a smartcard.

17. A non-transitory computer program product directly loadable into a memory of a digital processor for processing a ciphertext in a manner that increases robustness of the ciphertext processing against physical attacks, and comprising software code portions for causing the digital processor to determine a seed using a secret key and the ciphertext;
extract a public key candidate from the ciphertext using the seed; determine a checkvalue candidate based on the public key candidate; compare the checkvalue candidate with a checkvalue; and further process the ciphertext to output decrypted ciphertext if the comparison indicates that the checkvalue candidate corresponds to the checkvalue.

* * * * *